Patented June 11, 1940

2,203,764

UNITED STATES PATENT OFFICE 2,203,764

WARNING AGENT FOR POISONOUS GASES

Roger Gordon Aitken, McMasterville, Quebec, and Charles J. S. Warrington, Westmount, Quebec, Canada, assignors to Canadian Industries Limited, Montreal, Quebec, Canada, a corporation of Canada No Drawing. Application January 29, 1938, Serial No. 187,682. In Canada May 3, 1937

14 Claims. (Cl. 167—39)

This invention relates to a method of fumigation and disinfecting enclosed spaces, more particularly it relates to a method of preparing for fumigation purposes a lethal gas associated with a gas or gases which possess properties more irritating to the olfactory organ.

Hydrocyanic acid gas is used very extensively as a fumigant for the purpose of eliminating vermin from infested places such as buildings and ships and from vegetation. The use of it, however, is accompanied with considerable danger since a very small proportion in the air breathed, is quickly fatal to human life and the presence of the gas is not easily detected by the senses. There is, therefore, a risk of persons venturing into the fumigated area before the toxic gas has been completely removed. Other accidents may happen such as, for instance, the leaking of the gas into adjoining buildings, or should gas be generated during storage or transportation of the chemicals used in preparing the fumigant, persons in the vicinity would be exposed to the danger without warning.

It has been proposed to employ with hydrocyanic acid, other gases which are irritant to the eyes and nose but are less toxic to men and animals and will serve as a warning that dangerous gases are present, and in fact, a warning agent is insisted upon by local regulations in some sections of the country.

We are aware of United States Patents 1,786,623 and 1,886,487 in which it is proposed to use chloropicrin and cyanogen chloride as warning agents with hydrocyanic acid gas but these chemicals are expensive and cyanogen chloride itself is highly toxic, while its lachrymating effect is so great that operatives exposed to the toxic gases, may not be able to see clearly enough to make a rapid escape from the poisonous area.

An object of this invention is to provide a fumigant consisting of hydrocyanic acid gas and a warning agent.

A further object is to provide a composition of matter for the purpose of generating hydrocyanic acid gas and an irritant gas or gases simultaneously and which may be stored over a period of time with safety. Other objects will be hereinafter apparent.

Mixtures of hydrocyanic acid gas and sulphur dioxide are very suitable as fumigants and disinfectants of the class which are easily detected by their pungent and suffocating odor. They are not excessively lachrymatory. About eight ounces of hydrocyanic acid gas per thousand cubic feet air space is sufficient to exterminate vermin; with this quantity we use normally 0.61 ounce of sulphur dioxide, or by volume 0.23 cubic foot of sulphur dioxide to 1000 cubic feet of air containing hydrocyanic acid gas. Such air containing this quantity of sulphur dioxide is highly irritating and extremely difficult to breathe. The proportions may, however, be varied considerably according to the special conditions under which the fumigation is carried out. Experiments have shown that 0.023 part by volume of sulphur dioxide to 1000 parts of air are sufficiently irritating to give warning of its presence and renders breathing difficult. Henderson and Haggard—"Noxious Gases," state that 20 parts per million is the least quantity which will cause coughing and immediate irritation to the eyes.

We have found that stable compositions from which hydrocyanic acid gas and sulphur dioxide can be generated, may be prepared by mixing cyanides of metals particularly of the alkali or alkaline earth metals, with sulphurous acid salts of the class comprising normal sulphites or with the addition products of aldehydes with alkali metal bisulphites. Preferably we employ those normal sulphites which are insoluble in water; for example, the sulphites of the elements of group II of the periodic table, and of aluminum, lead, manganese and iron.

By the addition compounds of alkali metal bisulphites and aldehydes, we mean the compounds which are formed when an alkali metal bisulphite is mixed with an aldehyde solution according to the equation

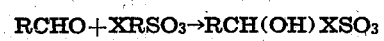

$$RCHO + XRSO_3 \rightarrow RCH(OH)XSO_3$$

where R stands for hydrogen or aliphatic or aromatic radical and X stands for an alkali metal.

The following mixtures for generating hydrocyanic acid gas with a warning agent for various uses are amongst those which are suitable and serve as examples.

Sodium cyanide and calcium sulphite; sodium cyanide and sodium bisulphite-formaldehyde compound; potassium cyanide and potassium bisulphite-acetaldehyde compound; calcium cyanide and sodium bisulphite-formaldehyde compound; sodium cyanide and aluminum sulphite.

Certain salts of sulphurous acid such as the bisulphites which are soluble in water are not suitable for our compositions because these salts on becoming moist in the presence of cyanides, generate hydrocyanic acid gas which may disrupt the container and escape into the atmosphere with consequent danger, or otherwise cause pressure in the container thus involving a hazard when opening.

A coloring matter such as ferric oxide may or may not be included in the compositions.

The invention may be illustrated but not limited by the following examples:

*Example 1*

411.5 parts by weight of sodium cyanide are mixed with 39.1 parts by weight of calcium sulphite. The mixture is quite stable upon storage. For use as a fumigant, 1 lb. of this mixture for every 1000 cubic feet of space is introduced into any suitable vessel and an excess of dilute sulphuric acid added. The gas liberated consists of about 8 ounces of hydrocyanic acid gas and about 0.73 ounce of sulphur dioxide gas and this quantity of the mixed gases per 1000 cubic feet of space is easily detected by the irritating odor of the sulphur dioxide.

*Example 2*

411.5 parts by weight of sodium cyanide are mixed with 37.3 parts by weight of barium sulphite and 15.3 parts by weight of aluminum sulphite. The mixture is kept in sealed containers until required and may be stored over long periods without showing any signs of decomposition. It is employed as a fumigant in the same manner as the mixture of Example 1, and gases are liberated in approximately the same proportions.

*Example 3*

Sodium bisulphite-formaldehyde compound is prepared by mixing 104 parts of sodium bisulphite into 75 parts of 40% formaldehyde. The mixture becomes warm and a solid product is formed. This compound is air-dried and pulverized. 22.8 parts by weight of this sodium bisulphite-formaldedyde compound is intimately mixed with 178.6 parts by weight of sodium cyanide and the mixture packed in containers which are then sealed. They may be stored for long periods of time without showing any signs of the contents decomposing. When used as a fumigant, the mixture is placed in a suitable vessel and an excess of dilute sulphuric acid added. The gas generated contains about 10 parts sulphur dioxide to about 99 parts of hydrocyanic acid gas. The presence of this gas is easily detected by the odor of the sulphur dioxide.

*Example 4*

A compound of acetaldehyde and potassium bisulphite is prepared by adding 120 parts of potassium bisulphite into 88 parts by weight of acetaldehyde solution. The solid product forms rapidly; it is then air-dried and pulverized. 51.2 parts of this addition compound are intimately mixed with 216.8 parts of potassium cyanide. The mixture is treated with dilute sulphuric acid in the same manner as in Example 1. The gas generated consists of 20 parts of sulphur dioxide to 90 parts of hydrocyanic acid gas.

*Example 5*

Five parts of sodium sulphite, 10 parts of sodium bisulphite-formaldehyde compound prepared as Example 3, 84 parts of calcium cyanide and 1 part of ferric oxide are intimately mixed together. The mixture has a red color which distinguishes it from ordinary cyanide. It may be stored in sealed containers over long periods of time without deterioration. For use as a fumigant we treat this mixture with hydrochloric acid in a suitable vessel and obtain gases in the the proportion of 49.2 parts of hydrocyanic acid gas to 6.9 parts of sulphur dioxide gas.

*Example 6*

411 parts of sodium cyanide and 170 parts of calcium sulphite were intimately mixed together, about 20¾ ounces of this mixture were added to dilute sulphuric acid in a room enclosing a space which measures about 1000 cubic feet and the room was closed up. After 24 hours the room was opened and partially ventilated. It was then found that the concentration of hydrocyanic gas was .012% by volume and the sulphur dioxide .002% by volume.

The proportions of sulphur dioxide to hydrocyanic acid in Examples 4, 5 and 6 are higher than in Examples 1, 2 and 3. It will be understood that in some cases it may be desirable to use these higher proportions. This is especially the case when the building to be fumigated adjoins other buildings which may be occupied and there is a possibility of the poisonous gases leaking into them. Under these circumstances very low concentrations of hydrocyanic gas may occur in the air of the occupied buildings and as the presence of over .012% by volume is dangerous, the higher proportion of the warning gas is advisable.

As many apparently widely different embodiments of this invention may be made without departing from the spirit and scope thereof, it is to be understood that the invention is not limited to the specific embodiments thereof except as defined in the appended claims.

We claim:

1. A method of producing a fumigating gas which comprises treating with an acid a mixture comprising a cyanide selected from the group consisting of the alkali metal and alkaline earth metal cyanides and a compound selected from the group consisting of insoluble metal sulfites and addition compounds of alkali metal bisulfites with aldehydes.

2. A method of producing a fumigating gas which comprises treating with an acid a mixture comprising a cyanide selected from the group consisting of the alkali metal and alkaline earth metal cyanides and a normal sulfite of an element of group II of the periodic table.

3. A method of producing a fumigating gas which comprises treating with an acid a mixture comprising a cyanide selected from the group consisting of the alkali metal and alkaline earth metal cyanides and calcium sulfite.

4. A method of producing a fumigating gas which comprises treating with an acid a mixture comprising a cyanide selected from the group consisting of the alkali metal and alkaline earth metal cyanides and an addition compound of an alkali metal bisulfite with an aldehyde.

5. A method of producing a fumigating gas which comprises treating with an acid a mixture comprising a cyanide selected from the group consisting of the alkali metal and alkaline earth metal cyanides and the addition compound of sodium bisulfite with formaldehyde.

6. A method of producing a fumigating gas which comprises treating with an acid a mixture comprising sodium cyanide and calcium sulfite.

7. A method of producing a fumigating gas which comprises treating with an acid a mixture comprising sodium cyanide and the addition compound of sodium bisulfite with formaldehyde.

8. A fumigant generating composition comprising a cyanide selected from the group consisting of the alkali metal and alkaline earth metal cyanides and a compound selected from the group consisting of insoluble metal sulfites and addition compounds of alkali metal bisulfites with aldehydes.

9. A fumigant generating composition comprising a cyanide selected from the group consisting of the alkali metal and alkaline earth metal cyanides and a normal sulfite of an element of group II of the periodic table.

10. A fumigant generating composition comprising a cyanide selected from the group consisting of the alkali metal and alkaline earth metal cyanides and calcium sulfite.

11. A fumigant generating composition comprising a cyanide selected from the group consisting of the alkali metal and alkaline earth metal cyanides and an addition compound of an alkali metal bisulfite with an aldehyde.

12. A fumigant generating composition comprising a cyanide selected from the group consisting of the alkali metal and alkaline earth metal cyanides and the addition compound of sodium bisulfite with formaldehyde.

13. A fumigant generating composition comprising a mixture of sodium cyanide and calcium sulfite.

14. A fumigant generating composition comprising a mixture of sodium cyanide and the addition compound of sodium bisulfite with formaldehyde.

ROGER GORDON AITKEN.
CHARLES J. S. WARRINGTON.